United States Patent
Schaefer et al.

(10) Patent No.: US 6,490,000 B1
(45) Date of Patent: Dec. 3, 2002

(54) METHOD AND APPARATUS FOR TIME SHIFTING AND CONTROLLING BROADCAST AUDIO AND VIDEO SIGNALS

(75) Inventors: Germar Schaefer, Monument; Danny J. Minnick, Littleton; Douglas E. McGary, Monument, all of CO (US)

(73) Assignee: EchoStar Communications Corporation ( * ) Notice: Subject to any disclaimer, the term of this patent is extended or adjusted under 35 U.S.C. 154(b) by 0 days.

(21) Appl. No.: 09/280,130

(22) Filed: Mar. 26, 1999

Related U.S. Application Data

(63) Continuation-in-part of application No. 09/151,246, filed on Sep. 14, 1998.
(60) Provisional application No. 60/068,684, filed on Dec. 24, 1997.

(51) Int. Cl.$^7$ .................................. H04N 5/445
(52) U.S. Cl. ................... 348/553; 348/559; 348/714
(58) Field of Search ................. 348/553, 563, 348/564, 565, 567, 569, 588, 722, 714, 725, 734, 559, 560, 634; 386/86, 125; H04N 5/445

(56) References Cited

U.S. PATENT DOCUMENTS

| | | | | |
|---|---|---|---|---|
| 5,311,317 A | * | 5/1994 | Ogura et al. | 348/441 |
| 5,774,186 A | * | 6/1998 | Brodsky et al. | 348/553 |
| 6,018,612 A | * | 1/2000 | Thomason et al. | 382/82 |

* cited by examiner

*Primary Examiner*—Michael H. Lee
(74) *Attorney, Agent, or Firm*—Kerry Miller

(57) ABSTRACT

A method and apparatus for delaying the display of a portion of audio and video broadcast signals received from a remote location. Received broadcast video and audio signals are placed in a first-in/first-out storage queue to enable the control of the playback of the signals. Signals may be placed in the tail of the queue while previously received signals are simultaneously routed from the head of the queue to a television monitor. Passing the signals through the queue creates the delay. The system may be controlled either by input to the receiver from the broadcast facility or by remote or manual control by the user. The control functions that are available to the user are pause, play, fast forward and replay. The control from the broadcast facility is through the ability to "mark" segments of the video and audio program to be immune to the fast forward function, thus guaranteeing that those segments are viewed by the user.

4 Claims, 2 Drawing Sheets

METHOD AND APPARATUS FOR TIME SHIFTING AND CONTROLLING BROADCAST AUDIO AND VIDEO SIGNALS

This application is a Continuation-In-Part of U.S. application Ser. No. 09/151,246, filed Sep. 14, 1998, which is co-pending, which claims the benefit of U.S. Provisional Application No. 60/068,684, filed Dec. 24, 1997.

FIELD OF THE INVENTION

The present invention relates to a television system for delaying the display of incoming video and audio signals. Specifically, the present invention relates to a method and apparatus for delaying the display of television programming by passing incoming video and audio signals through a queue before routing them to an output device.

BACKGROUND OF THE INVENTION

Viewers of TV broadcasts have always suffered from interruptions and distractions. These interruptions take the form of telephone calls, visitors, children, meals, etc. The viewer often is unable to view television programming during the interruption. While broadcasted sporting events often show instant replays, such replays immediately follow the live event and cannot be seen at a later time. Similarly, when a viewer is watching a broadcasted movie, interruptions can cause the viewer to miss critical parts of the movie and leave the viewer confused for the remainder of the movie. This problem is more significant with the advent of on demand video offered to subscribers at a premium price, where interruptions experienced during the broadcast of the program translate directly into wasted money.

Videotaping or otherwise recording the broadcast is often an unacceptable solution. By the same token, interruptions are often spontaneous, and give the viewer no advance warning to record the broadcast. Interruptions are often brief, allowing the user to quickly return to viewing the broadcast. In order to view a portion of a broadcast recorded during the interruption, the viewer must wait until the broadcast terminates, or record the broadcast in its entirety and view the entire recording. Again, the viewer would be required to keep a recorder and recording media prepared during all viewing times, thus eliminating the capability to record one broadcast while viewing another broadcast.

To solve the dilemma of viewer interruptions occurring during TV broadcasts, a solution is required that delays the viewing of portions of the TV broadcast without the use of traditional, dedicated video recording devices.

SUMMARY OF THE INVENTION

The present invention provides a method and apparatus to delay the display of television programming broadcast from a remote location. Broadcast video and audio signals are placed in a first-in/first-out storage queue to enable the control of the playback of the original video signal. Signals may be placed in the tail of the storage queue while other signals are simultaneously routed from the head of the storage queue to a television monitor. A delay is created as the signals are passed through the queue. The system may be controlled either from input to the receiver by the viewer or by remote control from the broadcast facility. The control mechanisms that are available to the viewer are pause, play, fast forward, and replay.

The control from the broadcast facility is through the ability to designate segments of the video and audio program to be immune to the fast-forward function. The present invention may thereby guarantee that a commercial advertisement is shown. The present invention enables TV commercial advertisers to mark their commercials with a prevention instruction in the signal to insure their advertisements are viewed by the user. In other words, the user is prevented from fast forwarding past these commercials. Also, other required broadcasts which must be viewed by the user, such as warnings of severe weather or national warnings broadcast by the Emergency Broadcast Association, can be so marked.

Other features and advantages of the present invention will become apparent from the following detailed description of the invention when it is considered in conjunction with the accompanying drawings.

DETAILED DESCRIPTION OF THE DRAWINGS

Figure 1:
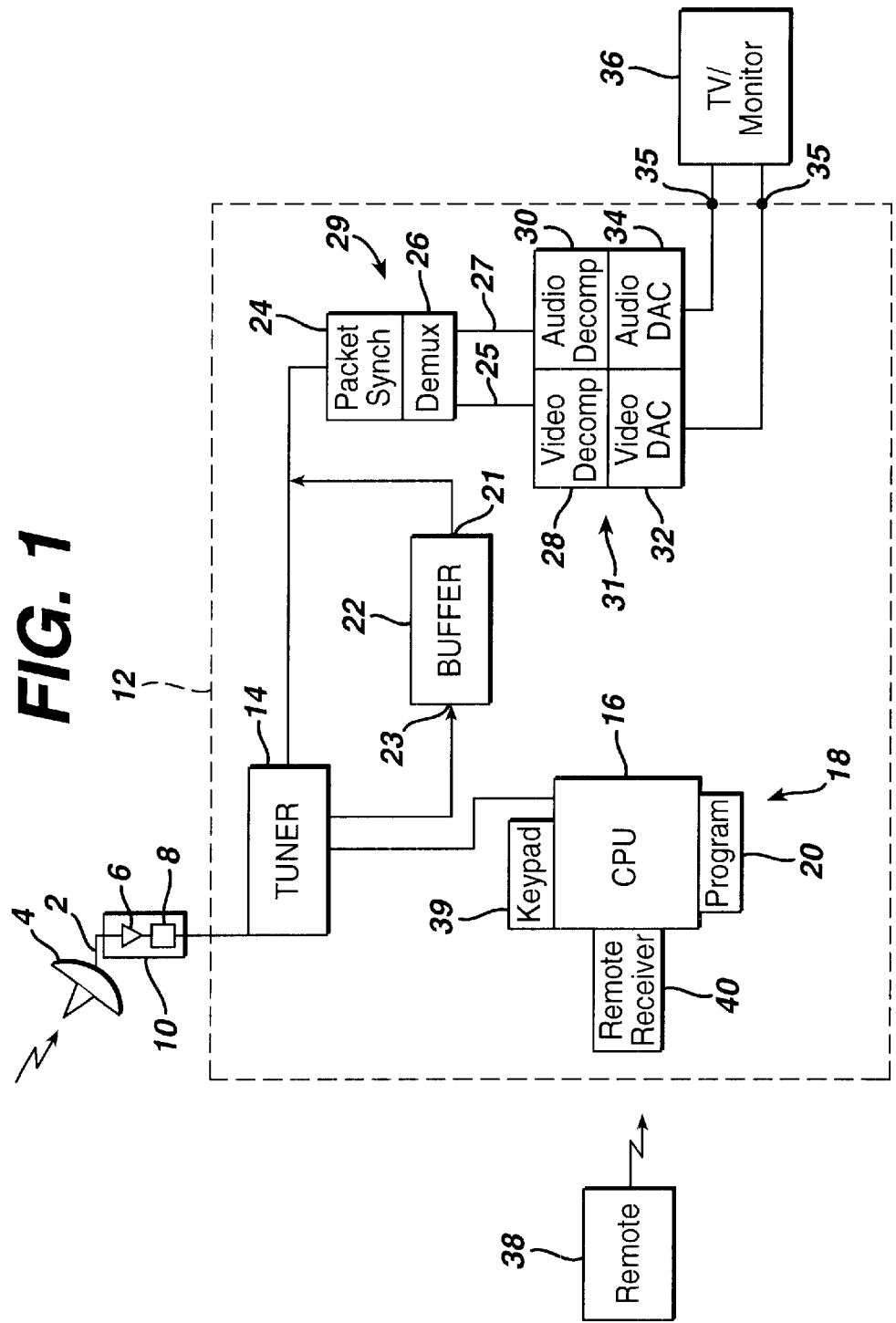
FIG. 1 is a block diagram illustrating the present invention and necessary components to receive and process video and audio signals.

FIG. 1 is a schematic that shows in block form the present invention and related components required to receive and process video and audio information as well as data. The preferred embodiment utilizes a direct broadcast satellite (DBS) system which can incorporate packetized transmission signals according to the MPEG-2 standard. However, the present invention may be used with any broadcast programming source, such as off-air analog or digital terrestrial transmission, cable TV, or HDTV. Additionally, with recent advances in telephony and computer data transmissions, it should be readily apparent that the present invention may also be used with other sources such as analog or digital telephony (e.g., SMDS, MAN), internet connections (e.g., ISDN, T1, T3, SONET, FDDI), computer network connections (e.g., RS-232 serial port, parallel port), or fiber optic signals. Broadcast is used herein in a broad sense to define the transmission of signals from any source to multiple users.

Encrypted direct broadcast satellite DBS signals, ranging from approximately 12.2 GHz to approximately 12.7 GHz, are received as downlinked signals 2 by satellite antenna 4, a parabolic dish which can be approximately eighteen inches to one meter in diameter. Front end processing of the satellite signal is accomplished by a low noise block down converter feed (LNBF) provided at the antenna focal point. This includes a converter module 10 with a low noise amplifier 6 which receives the signals from the antenna and by means of the block down converter 8 converts the entire frequency band of satellite signals to a lower, intermediate frequency range of approximately 0.95 to 2.15 GHz, which can be transmitted via coaxial cable to a satellite receiver 12. Tuner 14 selects a specific frequency band or channel from the downlinked signal 2 and demodulates the corresponding audio and video signals. Tuner 14 is controlled by CPU 16 to feed the signals to either the buffer 22 or the digital decoder 29, depending on the state of the delay program 20. In the preferred embodiment, the digital decoder 29 includes an error correction and packet synchronization module 24 and packet demultiplexer 26. The error correction and packet synchronization module 24 combines a QPSK decoder and a Reed-Solomon and Viterbi forward error corrector. The QPSK decoder accepts the digital signals from tuner 14 and converts them to data and checksum bits corresponding to packets in the data stream 2. The forward error correction logic accepts the data and checksum bits and corrects errors that occurred in the transmission of data stream 2. The error correction and packet synchronization module 24 can output a fully compliant MPEG-2 transport stream as defined by the ISO 13818 MPEG specification. Output from the error correction and packet synchronization module 24 is directed to the packet demultiplexer 26.

The packet demultiplexer 26 is an integrated circuit that accepts the packetized, time domain multiplexed data stream of the MPEG-2 transport stream and routes the packets to various areas within satellite receiver 12. Audio is output as an audio stream 27, and is accepted by the audio decompressor 30. Video is output as a video stream 25, and is accepted by the video decompressor 28. Audio stream 25 and video stream 27 can be fully compliant audio and video program elementary streams as defined by ISO 13818-2 and ISO 13818-3 of the MPEG-2 standard, respectively. In addition to routing packets of data, packet demultiplexer 26 also unscrambles encrypted data, provides buffering of the MPEG data, and maintains program clock reference handling to keep the local clock synchronized with the clock at the uplink center.

The display decoder 31 receives the video stream 25 and audio stream 27 from the digital decoder 29. The display decoder 31 includes video decompressor 28 and audio decompressor 30 which decompress video stream 25 and audio stream 27, respectively, into digital signals. The display decoder 31 also includes digital to analog converter 32 and digital to analog converter 34, which convert video stream 25 and audio stream 27, respectively, into analog signals. The resulting baseband analog signals are then sent to connectors 35 located on the outside of satellite receiver 12, which connect to TV/monitor 36.

Buffer 22 is a storage device that may be organized as a queue having a head 21 and a tail 23. The queue stores the signals in a first-in/first-out scheme, such that demodulated audio and video signals are passed from the tuner 14 to the tail 23, progress through the queue, and are routed from the head 21 to the digital decoder 29. In the preferred embodiment, buffer 22 is implemented as one or more high speed hard disks, but any storage device that may be organized as a queue, which has a high storage capacity for audio and video signals, and which operates at acceptable speeds (e.g., solid state, magnetic, circuitry, optical) may be used.

The delay program 20 is an instruction set that manipulates the buffer 22 to delay the presentation of broadcast programming information to a viewer. While the delay program 20 may be implemented through hardware, in the preferred embodiment the delay program 20 is a software program stored in memory 18. Memory 18 is preferably DRAM, but also may be flash, ferroelectric, or other non-volatile memory, or conventional RAM with a battery backup. In the preferred embodiment, an LSI 64002 microprocessor may be used as the CPU 16.

User input is supplied to the receiver 12 either through remote control device 38 or keypad 39. Remote control device 38 sends a UHF or infrared signal to remote receiver 40, which passes the desired command to CPU 16. Keypad 39, located on the satellite receiver 12, can also supply user commands to the CPU 16.

While the satellite receiver 12 utilizes a source of direct broadcast satellite signals, other sources capable of transmitting digital and analog broadcast signals may be used. These audio/video sources may include, but are not limited to: DBS satellite, cable, HDTV, analog or digital terrestrial sources, analog or digital telephony, internet connections, computer network connections, or optical fiber sources.

Figure 2:
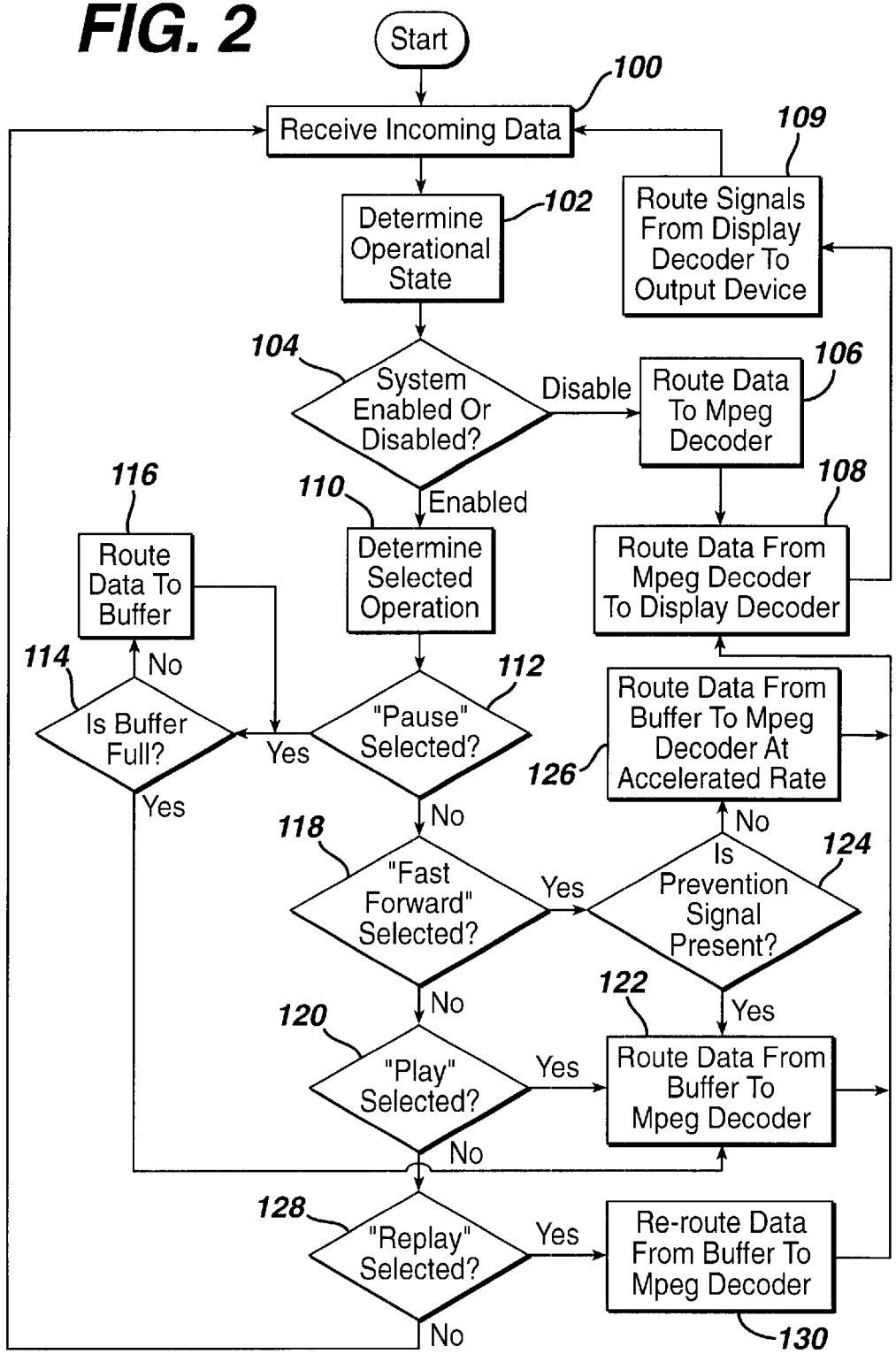
FIG. 2 is a logic diagram showing the logical sequence of steps required to practice the present invention.

FIG. 2 describes the logical sequence of steps required to practice the present invention. Beginning at step 100, the tuner 14 receives, selects and demodulates incoming audio and video data corresponding to a channel selected by a user. At step 102, the user either enables or disables the time shifting system. There are two operational states for the system, the pause (or enabled) state and the normal (disabled) state. Based on the operational state (step 104), the program branches to one of two threads of control. If the delay program 20 is in the normal state, control continues to step 106, where the incoming video and audio signals are routed from the tuner 14 to the digital decoder 29. Control continues to step 108, where signals output from the digital decoder 29 are routed to the display decoder 31, and are then output to the TV/monitor 36 in step 109. Control is then returned to step 100.

However, if at step 104 the CPU 16 determines that the delay program 20 is in the pause state, control continues to step 110, where the user selects a desired operation. The operations that may be selected by a user include pause, play, replay, and fast forward. The user may also activate and deactivate the delay program 20. User commands are entered via individual keys on the remote control device 38 or the keypad 39. For simplicity, FIG. 2 diagrams evaluation of the selected operations in a sequential manner. If the user requires the incoming video and audio signals to be delayed before being output to the TV monitor 36, the pause state is selected (step 112). Control continues to step 114 where the buffer 22 is checked to see if it is full. If the buffer is not full, the incoming video and audio signals are routed to the tail 23 of the buffer 22 in step 116. Control returns to step 114. If the buffer 22 is full, then stored signals must be flushed from the head 21 of the buffer 22 to allow storage of the incoming video and audio signals. Control continues to step 122, where the video and audio signals are routed from the head 21 of the buffer 22 to the digital decoder 29. Steps 108 and 109 then operate as before to route signals to display decoder 31 and then output through connectors 35 to TV/monitor 36.

If the fast forward operation is selected, step 118, the video and audio signals stored in the buffer 22 are examined for the presence of a prevention signal that prevents the user from accelerating the display of the video and audio signals to the TV/monitor 36. The prevention signal, in the form of a status bit, is inserted into the data stream at the uplink center, and may be used in television commercials, public service announcements, emergency broadcasts, and the like. Status bits included in the data stream allow the system to prevent the user from fast forwarding through certain programming segments. If a segment has this status bit set and the user attempts to fast forward the stream, an icon will be displayed notifying the user and the stream will continue to play at normal speed Depending on whether the status bit is present, in step 124 control may branch in one of two directions. If the status bit is present, control branches to step 122, where video and audio signals stored in the buffer 22 are routed from the head 23 to the digital IV decoder 29 at the normal speed for viewing, and then signals are routed from the digital decoder 29 to the display decoder 31 at step 108. Output signals from the display decoder 31 are passed to the TV/monitor 36 at step 109.

However, if the status bit is not included in the video and audio signals at step 124, control continues to step 126, where video and audio signals are routed from the head 23 of buffer 22 to the digital decoder 29 at an accelerated rate, and from the digital decoder 29 to the display decoder 31 at step 108. Output signals from the display decoder 31 are passed to the TV/monitor 36 at step 109. The result is the audio and video signals are displayed over the TV/monitor 36 at an accelerated rate, allowing a user to fast forward through undesirable programming. The fast forward operation flushes the buffer 22. In the event that the buffer 22 is exhausted during a fast forward operation while the system is in the pause state, the system transitions to the normal state and incoming signals are routed directly to the digital decoder 29. Returning to step 118, if fast forward is not selected, control proceeds to step 120. If play is selected, control proceeds to step 122, where video and audio signals stored in the buffer 22 are routed from the head 23 to the digital decoder 29 at the normal speed for viewing, and then signals are routed from the digital decoder 29 to the display decoder 31 at step 108. Output signals from the display decoder 31 are passed to the TV/monitor 36 at step 109. If the system is in the pause state, selecting the play option delays the display of incoming video and audio signals. Incoming video and audio signals are delayed by being routed to the tail 21 of the buffer 22, then pass through the buffer 22, and are finally routed from the head 23 of buffer 22 to the digital decoder 29. When play is selected in the pause state, incoming signals are routed to the tail 23 at the same rate signals are routed from the head 21 to the digital decoder 29.

If play is not selected at step 120, control continues to step 128. If replay is selected, control continues to step 130, where the buffer 22 is closed to incoming video and audio signals, and video and audio signals stored in the buffer 22 are accessed, but not flushed, and can be repeatedly routed to the digital decoder 29, display decoder 31, and output as in steps 108 and 109, so the user may replay those video and audio signals as many times as desired. However, if replay is not selected at step 128, then input is ignored and control returns to step 100.

While an improved interface for a television system incorporating a system to delay the broadcast of received video and audio signals has been shown and described in detail in this application, it is to be understood that this invention is not to be limited to the exact form disclosed and changes in detail and construction of the various embodiments of the invention may be made without departing from the spirit thereof.

What is claimed is:

1. An apparatus for delaying the output of received signals to a user, said apparatus comprising:

a) a receiving means for receiving signals;

b) a storage means for storing said received signals, said storage means comprising a queue, said queue having sections for storing received signals, said sections comprising a head section, a tail section and one or more intermediate sections located between said head section and tail section, said received signals being initially stored at said tail section and progressing through said intermediate sections to said head section in a first-in/first-out manner;

c) an output means for outputting said received signals to a user; and d) a control means for controllably routing said received signals from said receiving means to said tail section and simultaneously routing stored signals from said head section to said output means, wherein said control means further comprises means for routing said stored signals from said head section to said output means at a first rate and means for simultaneously routing said received signals so said tail section of said storage means at a second rate and wherein said control means further comprises means for preventing said first rate from accelerating above the second rate.

2. An apparatus as defined in claim 1, wherein said control means is actuated to prevent said first rate from accelerating above said second rate upon reception of an appropriate instruction in said received signals.

3. A method for delaying the output of received signals to an output means, said method comprising the steps of:

a) receiving signals;

b) storing said received signals in a storage device, said storage device comprising a queue, said queue having a plurality of sections for storing said received signals, said sections comprising a head section, a tail section, and one or more intermediate sections located between said head section and said tail section, said received signals being initially stored at said tail section and progressing through said intermediate sections to said head section in a first-in/first-out manner; and c) controllably routing said stored signals from said head section to said output means at a first rate and simultaneously routing said received signals from said tail section at a second rate; and d) preventing said first rate from accelerating above said second rate.

4. A method as defined in claim 3, wherein said step of preventing said first rate from accelerating above said second rate is initiated upon reception of an appropriate instruction in said received signals.

* * * * *